Oct. 19, 1937.　　　J. W. SCHMIDT　　　2,096,472
BLADE ANCHORING WEDGE
Filed Nov. 30, 1936

Joseph W. Schmidt, Inventor

By Wheeler, Wheeler & Wheeler
Attorneys

Patented Oct. 19, 1937

2,096,472

UNITED STATES PATENT OFFICE 2,096,472

BLADE ANCHORING WEDGE

Joseph W. Schmidt, Milwaukee, Wis., assignor to Wetmore Reamer Co., Milwaukee, Wis., a corporation of Wisconsin Application November 30, 1936, Serial No. 113,324

REISSUED

2 Claims. (Cl. 29—105)

This invention relates to improvements in blade anchoring wedges. The invention has particular application to wedges for the retention of blades inserted in a reamer or other rotary cutting tool.

It is the primary object of the invention to provide a blade anchoring wedge with adjusting means which is not only adapted to seat the wedge for the retention of the tool, but is also adapted to provide support for the wedge when the wedge is free of the tool, and to release the wedge from clamping engagement with the tool and thereby to obviate the necessity for using a hammer for the release of the wedge.

More specifically, I propose to adjust the wedge in both directions by manipulation of a right and left hand screw, in threaded engagement both with the wedge and the body of the tool, whereby to accomplish the functions aforesaid.

In the drawing.

Like parts are identified by the same reference characters throughout the several views.

Figure 1:
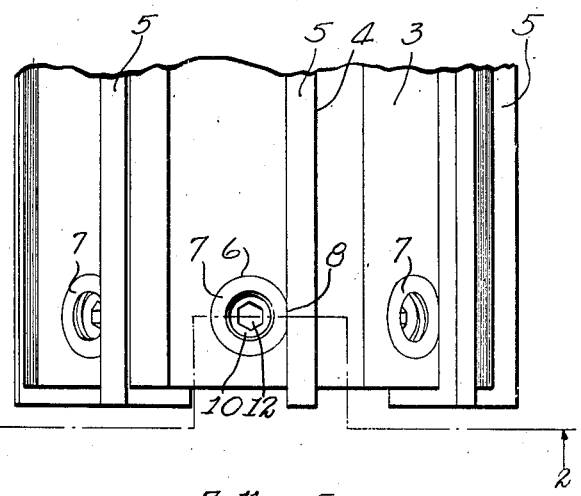
Figure 1 is a fragmentary side elevation of a rotatable cutting tool embodying the invention.
Figure 2:
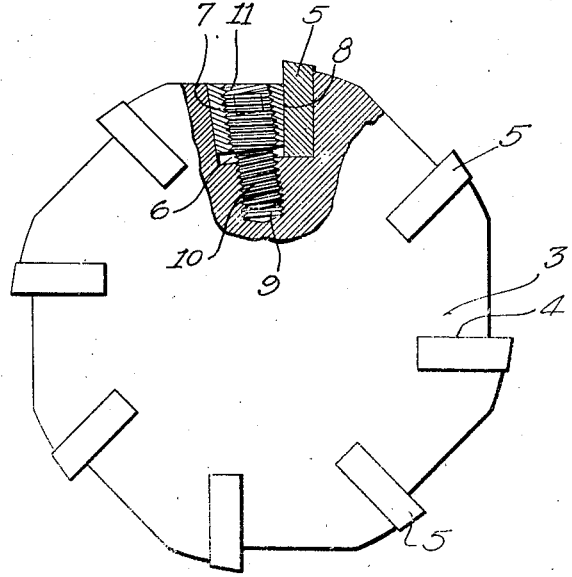
Figure 2 is an end elevation of the tool, a portion thereof being broken away to a section exposing the wedge adjusting means.

My improved tool comprises a body portion 3 having suitable slots 4 in its periphery for the reception of renewable tool blades 5.

The bores 6 intersect the slots 4 and are equipped with generally cylindrical wedge members 7, having their faces flattened at 8 for engagement with the respective tool blades 5.

From the bottom of each bore 6 there extends into the body of the tool a tapped socket 9 to receive the smaller threaded end of an adjusting screw 10. The wedge 7 has an aligned aperture 11 which is oppositely threaded to receive the larger end of the adjusting screw.

The respective ends of the adjusting screw have right and left hand threads, as illustrated. In consequence, the rotation of the screw in one direction will draw the wedge 7 downwardly into bore 6 to seat its face 8 in clamping engagement with the tool blade 5. The opposite rotation of the adjusting screw will force the wedge from its binding engagement with the tool blade and will gradually withdraw the wedge to a position where the tool may readily be removed and replaced. Even when the wedge is free of the tool it cannot fall from the bore 6, in which it operates, since the threads of the adjusting screw will remain in engagement, both with the wedge and with the tool body 3, to maintain an operative connection between these parts.

Any desired means, such as the polygonal socket 12, may be provided for the reception of a wrench suitable for the manipulation of the adjusting screw.

I claim:

1. In a device of the character described, the combination with a tool body having a longitudinal slot upon its periphery and provided with an inclined bore intersecting the slot, of a tool blade in the slot, a generally cylindrical wedge reciprocable in the bore and having one beveled face finished for clamping engagement with said blade, an adjusting screw for said wedge having right and left hand threaded portions, one of said portions being of reduced diameter as compared with the other, one of said portions being in threaded connection with the wedge, and the other being in threaded connection with said body.

2. The combination with a tool body, having a peripheral slot and provided with a wedge opening intersecting the slot and having an inclined face converging inwardly toward the slot, of a tool blade in the slot, a wedge in the opening bearing against said face and said blade, and an adjusting screw for the wedge having right and left hand threaded portions, the portion of said screw engaged in the wedge being of relatively large diameter, and a portion of said screw engaged in the tool body being of smaller diameter, the larger portion of said screw having a terminal socket adapted to receive a wrench for the manipulation of the screw.

JOSEPH W. SCHMIDT.